A. F. RIETZEL.
WELDING PIECE FOR ELECTRICALLY WELDED METAL WORK.
APPLICATION FILED JUNE 14, 1913.

1,128,515.                                      Patented Feb. 16, 1915.

WITNESSES

INVENTOR
ADOLPH F. RIETZEL
BY
ATTORNEYS

UNITED STATES PATENT OFFICE.

ADOLPH F. RIETZEL, OF CHARLESTOWN, RHODE ISLAND, ASSIGNOR TO UNIVERSAL ELECTRIC WELDING COMPANY, OF NEW YORK, N. Y., A CORPORATION OF NEW YORK.

WELDING-PIECE FOR ELECTRICALLY-WELDED METAL-WORK.

1,128,515.      Specification of Letters Patent.      Patented Feb. 16, 1915.

Original application filed September 16, 1909, Serial No. 517,972. Divided and this application filed June 14, 1913. Serial No. 773,586.

*To all whom it may concern:*

Be it known that I, ADOLPH F. RIETZEL, a citizen of the United States, and a resident of Charlestown, in the county of Washington and State of Rhode Island, have invented certain new and useful Improvements in Welding-Pieces for Electrically-Welded Metal-Work, of which the following is a specification.

My invention relates to a metal blank or piece of metal adapted for use with two pieces of metal to be joined by an electric welding process and by the welding of said blank to either or both of said pieces.

Figure 1:
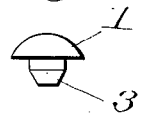
Figure 2:
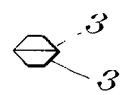
Figure 3:
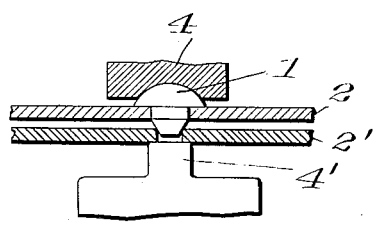
Figure 4:
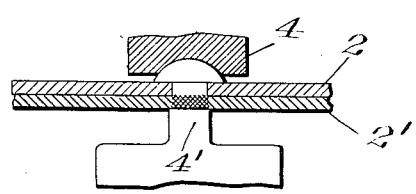
Figure 5:
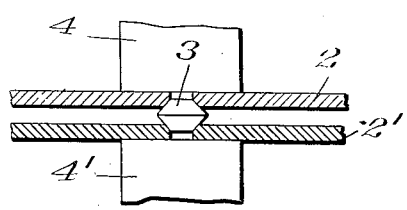
Figure 6:
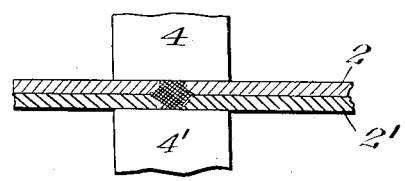

Figure 1 shows in side elevation a blank embodying my invention. Fig. 2 illustrates another form of blank embodying the invention. Fig. 3 shows the application of the blank illustrated in Fig. 1 to the uniting of two plates or pieces of metal. Fig. 4 shows the two pieces united. Fig. 5 shows the application of the blank illustrated in Fig. 2 to the welding of two pieces of metal together and Fig. 6 shows the finished union.

The blank embodying my invention shown in Fig. 1 is analogous in form to a rivet as to one end thereof since it has a prepared head 1 and a shank adapted to be inserted through a hole extending as a perforation entirely through one of the pieces to be united. The shank or reduced portion, however, is, according to my present invention, suitably formed to permit it to engage with and become welded to the other of the two pieces to be united by a process of electric welding, which causes the end portion of the shank to become welded to the other one of the two pieces. One of the ways of so forming said end portion of the blank is to provide it with a taper extending preferably clear around the shank or end portion of the shank and so that said end, being reduced in size, may enter a suitably formed hole in said opposite piece and in which it may become welded to said piece.

The application of a blank of the particular form shown in Fig. 1 to the union of two plates, sheets or other pieces of metal by the electric welding of the end portion of the shank to one of said pieces is illustrated in Figs. 3 and 4, wherein the two plates or pieces are indicated by the numerals 2 2', while 4 4' represent respectively electrodes of a welding machine by which electric heating current and pressure may be applied to the blank and pieces. As shown, the tapered portion of the blank welding piece preparatory to the application of the heating and pressure is arranged to engage the edges of a hole or cavity in one of the pieces 2', its head being at the outside of the opposite piece. The extent of the taper or length of shank may be such that the extremity of the shank will stop short of the outer surface of the part 2' when the blank is entered in the hole, so that a considerable void space will be left to receive the metal rendered plastic by the heat and displaced by the application of the pressure. Upon the application of the heating electric current and pressure the plates will be fastened together as shown in Fig. 4. The displaced metal will completely fill the opening or cavity in the part 2' and the blank will become welded in said opening, thus uniting the two pieces by the welding of the shank of the blank to the piece 2' and by the engagement of the head with the outer surface of the opposite piece.

The blank welding piece shown in Fig. 2 instead of being headed on one end, like the blank in Fig. 1, is reduced or has a taper at both ends to permit it to enter a suitably formed hole in the meeting face of each of the two pieces to be united and so that the union is effected by a welding of each end of the blank in a hole in the pieces to be united, the welding being effected by the application of the heating current and pressure after the blank has been arranged between the pieces, as shown in Fig. 5.

Fig. 6 shows the completed union in which the blank fills the void space in the pieces 2 2' shown in Fig. 5 and becomes welded to both of them.

In carrying out my invention the taper of the blank such as shown in Fig. 1 might be extended so as to provide a partial void space in the upper of the two pieces 2 2' wherein the heated metal displaced in the operation would be received, but this is not necessary, and the void space provided may be confined to the space existing around the shank at its tapered portion when inserted in the cavity or opening in the space 2'. It is obvious that in the use of the blank the cavity or hole for the tapered or reduced end may be provided by the use of a punch which will perforate the plate receiving said tapered end, as is usual in perforating plates for riveting them together and it is further obvious that the blank provided by my invention is in some respects analogous to an ordinary rivet blank, particularly in the case of the form shown in Fig. 1, wherein a head is provided at one end thereof. In the case of the form shown in Fig. 2, however, there is no head in the true sense of a rivet head and in this case, as in the case of the blank Fig. 1, the use of the blank to form the union involves a true welding of the blank to the pieces to be joined without necessarily heading the blank over the outside of either piece. It is likewise evident that the cavity or opening designed to receive the end of the blank welding piece may be formed in any shape desired, but that the taper provided on the blank particularly adapts it to use in an operation in which the metal is prepared by punching the hole which receives the end of the blank. The form shown in Fig. 2 is particularly useful, since the union of the two plates can be effected in such manner that no projection above the outer surface of either plate will be left and two plates will be united firmly by an electrical welding of the button or blank to both pieces. The extent to which the tapered end of the blank shall enter the perforation and the angle of the taper are matters of choice.

The form or construction of blank herein described is also described in my original application for patent, filed September 16th 1909, Serial Number 517,972, of which the present application constitutes a division.

I do not claim herein the method of uniting two pieces of metal by blanks welded in holes in their meeting surfaces nor do I claim the product of said process, as these form the subject of claims in an application filed by me as a division of the present and of my original application for patent filed September 16th 1909, Serial No. 517,972.

What I claim as my invention is:—

1. An electric welding blank adapted to be welded between and unite two pieces of metal and having a tapered shank as and for the purpose described.

2. An electric welding blank adapted to be welded between and unite two pieces of metal and tapered at both ends as and for the purpose described.

3. An electric welding blank adapted to be welded between and unite two pieces of metal and having a tapered shank adapted to pass partially through a perforation in one of the pieces to be united.

4. An electric welding blank having a tapered shank adapted to enter a hole in one of the pieces to be united with its extremity short of the bottom of said hole.

5. An electric welding piece adapted to unite two pieces of metal and consisting of a metal blank adapted to partially enter a hole in the two pieces to be united when inserted between them.

6. An electric welding blank adapted to be welded between and unite two pieces of metal and having a shank tapered at its end and adapted to partially enter a hole in the piece to be united.

7. An electric welding blank adapted to be welded between and unite two pieces of metal, said blank being reduced at both ends to permit it to enter holes in the meeting faces of said pieces and to become welded in said holes by the application of heating electric current and pressure.

Signed at Westerly, in the county of Washington and State of Rhode Island this 9th day of June A. D. 1913.

ADOLPH F. RIETZEL.

Witnesses:
HERBERT L. SMITH,
HARRY B. AGARD.